United States Patent [19]

Nishimura et al.

[11] Patent Number: 4,982,355

[45] Date of Patent: Jan. 1, 1991

[54] LOW-POWER PARALLEL MULTIPLIER

[75] Inventors: Eiichi Nishimura; Takao Nakamura; Hisaki Ishida, all of Tokyo, Japan

[73] Assignee: Oki Electric Industry Company Inc., Japan

[21] Appl. No.: 300,492

[22] Filed: Jan. 20, 1989

[30] Foreign Application Priority Data

Jan. 25, 1988 [JP] Japan ................... 63-14184

[51] Int. Cl.⁵ .............................................. G06F 7/52
[52] U.S. Cl. ....................................... 364/758; 364/707
[58] Field of Search ............... 364/757, 758, 759, 760, 364/707

[56] References Cited

U.S. PATENT DOCUMENTS

| | | | |
|---|---|---|---|
| 3,900,724 | 8/1975 | McIver et al. | 364/758 |
| 4,369,500 | 1/1983 | Fette | 364/758 |
| 4,441,158 | 4/1984 | Kanuma | 364/758 |
| 4,598,382 | 7/1986 | Sato | 364/757 |
| 4,736,335 | 4/1988 | Barkan | 364/758 |
| 4,748,583 | 5/1988 | Noll | 364/758 |

FOREIGN PATENT DOCUMENTS 2540261  3/1984  France .

OTHER PUBLICATIONS

"Overview on the Circuit Configuration of Multipliers Performing Parallel Multiplication on which LSIS are Increasingly Used", *Nikkei Electronics*, May 29, 1978, pp. 76-90.

Hill et al, *Digital Systems: Hardware Organization and Design*, Second Edition, John Wiley & Sons, pp. 603-606.

Deverell, "Pipeline Iterative Arithmetic Arrays", *IEEE Trans. on Computers*, Mar. 1975, pp. 317-322.

Primary Examiner—David H. Malzahn
Attorney, Agent, or Firm—Edward D. Manzo

[57] ABSTRACT

A parallel multiplier consists of a systolic array of AND gates and full adders organized in stages so that each stage generates a partial product, adds it to the preceding partial products, and furnishes the sum to the next stage. A control circuit is provided that disables the outputs of each stage of the array until the operation in the particular stage is completed. The disabling of outputs reduces power consumption.

24 Claims, 7 Drawing Sheets

UNIT CIRCUIT B

FIG. 5

UNIT CIRCUIT A

LOW-POWER PARALLEL MULTIPLIER

BACKGROUND OF THE INVENTION

This invention relates to a parallel multiplier comprising a plurality of full-adding circuits interconnected in a systolic array.

Parallel multipliers can perform high-speed multiplication in large-scale integrated (LSI) or very-large-scale integrated (VLSI) microprocessors, digital signal processors, and other types of digital circuits. A parallel multiplier comprises a plurality of unit circuits having full-adding circuits, each of which multiplies a single pair of bits. The unit circuits are organized into stages that generate partial products. Each stage adds its partial product to the sum of the partial products in the previous stages and supplies the result to the next stage, causing the addition of partial products to "ripple" rapidly through the array and the final product to be produced at the end. In other words, the operation "progresses" or "propagates" from the first stage to the final stage and the intermediate results of the calculation appear at short intervals in sequence at the outputs of the first through the final stages.

A problem of prior-art parallel multipliers of this design is their high power consumption.

SUMMARY OF THE INVENTION

It is accordingly an object of the present invention to provide a parallel multiplier with reduced power consumption.

A parallel multiplier according to this invention comprises an array of unit circuits interconnected in stages for generating and adding the partial products in a multiplication operation, outputs of unit circuits in each stage being provided as inputs to unit circuits in the next stage, and a control circuit for disabling the outputs from the unit circuits in some or all of the stages, approximately in time with the progress of the operation, i.e. for disabling the outputs from the unit circuits in a particular stage until approximately the time when the operations performed in those unit circuits have been completed.

DETAILED DESCRIPTION OF THE EMBODIMENTS

Novel parallel multipliers embodying the present invention will be described with reference to the drawings. Only 4×4-bit multipliers will be shown, but it will be clear that the inventive concept is applicable to larger-scale multipliers as well. For convenience of description, it is assumed that the high state of a signal is the "1" or active state, that power consumption is higher in this state, that the low state is the "0" or inactive state, and that power consumption is lower in this state.

Figure 1:
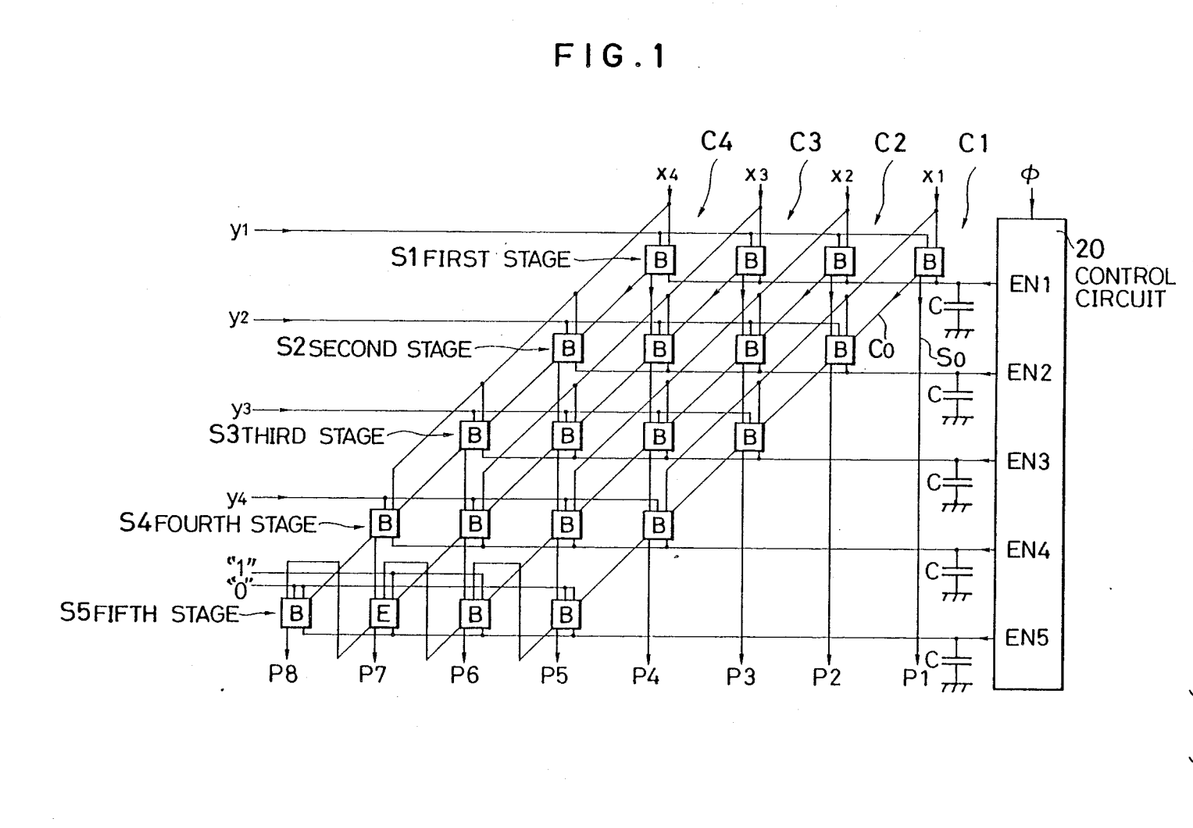
FIG. 1 is a schematic diagram of a parallel multiplier embodying the present invention.
Figure 1A:
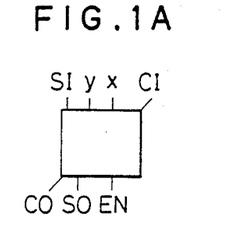
FIG. 1A is a diagram showing the positions of the respective terminals in the schematic representation of the unit circuit circuit B.
Figure 2:
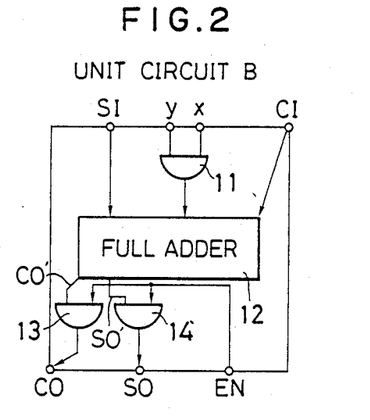
FIG. 2 is a more detailed schematic diagram, illustrating the unit circuits B in FIG. 1.

A first parallel multiplier embodying the present invention will be described with reference to FIGS. 1 to 4. FIG. 1 is a schematic diagram illustrating a 4×4 bit parallel multiplier comprising a plurality of identical unit circuits B interconnected in the form of an array consisting of five stages S1 to S5 by four columns C1 to C4 for generating the product of a pair of 4-bit binary numbers by progressively adding their partial products. FIG. 2 is a schematic diagram of the unit circuits marked B in FIG. 1.

The unit circuit B illustrated in FIG. 2 comprises an AND gate 11, a full adder 12, and a pair of AND gates 13 and 14. The AND gate 11 receives a multiplicand bit x and a multiplier bit y and generates a partial product bit $x*y$. The full adder 12 receives a sum input SI, a carry input CI, and the partial product bit $x*y$ from the AND gate 11 and adds them to generate a sum output SO' and a carry output CO'.

The sum input SI and carry input CI are provided, for example, by unit circuits in the preceding stage of the array in FIG. 1. The AND gate 13 receives the carry output CO' output from the full adder 12 and ANDs it with an enable signal EN. The AND gate 14 receives the sum output SO' from the full adder 12 and ANDs it with the same enable signal EN. The AND gates 13 and 14 thus function as an enabling means for the outputs of the full adder 12: when the enable signal EN is in the active state (high), the carry and sum outputs CO' and SO' received from the full adder 12 become the carry and sum output signals CO and SO produced by the unit circuit B; but when the enable signal EN is in the inactive state (low), the carry and sum outputs CO and SO from the unit circuit B are held to the "0" state, in which state power consumption is reduced.

The interconnection of the unit circuits B will be described with reference to FIG. 1. This parallel multiplier comprises an array of $4^2$ (=16) unit circuits B arranged in the first to fourth stages S1 to stage S4, followed by a fifth or final stage S5 comprising four additional unit circuits B. The rightmost unit circuit B in each stage will be referred to as belonging to the column C1, the unit circuit to its left as belonging to the column C2, the next unit circuit to the left as belonging to the column C3, the leftmost unit circuit as belonging to the column C4. The columns thus run diagonally in the drawing. The multiplier bits y1 to y4 are supplied as inputs to the unit circuits B in respective stages S1 to S4. The multiplicand bits x1 to x4 are supplied to the unit circuits B in the respective columns C1 to C4, except that they are not provided to the unit circuits in the final stage S5. The carry inputs CI of the unit circuits in the stage S2 and the subsequent stages S3 to S5 are connected to the carry outputs CO of the unit circuits in the same column in the preceding stage. The sum inputs of the unit circuits in the columns (C1 to C3) other than the highest column C4 in the stage S2 and the subsequent stages S3 to S5 are connected to the sum outputs SO from the unit circuits in the next-higher column of the preceding stage. The sum inputs SI and carry inputs CI of the unit circuits in the stage S1 and sum inputs SI of the unit circuits in the column C4 of the stages S2 to S4 are shown as unconnected; these inputs are always "0." The sum outputs SO of the unit circuits in the column C1 are connected to output terminals P1 to P5 of the parallel multiplier and supply the lower bits, which are also denoted by P1 to P5, of the final product. The higher bits P6 to P8 of the product are generated by the sum outputs SO of the unit circuits B in the columns 2 to 4 of the final stage S5.

Since it is not necessary for the unit circuits B in the final stage S5 to perform bit multiplication, their multiplicand (y) and multiplier (x) inputs are connected as follows: the unit circuits B in the columns 1 and 4 of the final stage S5 receive fixed multiplicand (x) and multiplier (y) inputs of "0;" the unit circuits B in the columns 2 and 3 of the final stage S5 receive fixed multiplicand (x) inputs of "1," while their multiplier (y) inputs are the carry outputs CO from the unit circuits B in the preceding column (C1 or C2) of the final stage S5. The carry output CO from the unit circuit in the column C3 of the final stage S5 is connected to the sum input SI of the unit circuit in the column C4 of the final stage S5. The carry output CO from the unit circuit in the column C4 of the final stage S5 is always "0," so it is not connected.

It can readily be seen that these interconnections cause the partial product generated in a given stage to be added to the sum represented by the sum outputs SO and carry outputs CO from the preceding stage, and the result to be furnished as a new sum to the next stage. The final stage S5 adds the sum outputs SO and carry outputs CO received from the stage S4, then also adds any further carry bits generated by this addition to produce a final result.

Figure 3:
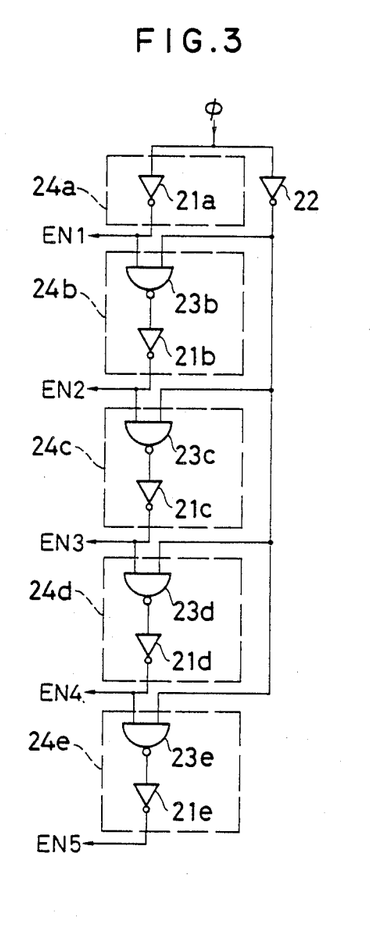
FIG. 3 is a more detailed schematic diagram illustrating the control circuit in FIG. 1.

The enable signals for the unit circuits B in FIG. 1 are supplied by a control circuit 20 which generates five enable signals EN1 to EN5. A schematic diagram of the control circuit 20 is shown in FIG. 3. The control circuit 20 comprises an inverter 22 receiving and inverting a clock signal $\phi$, and first to fifth delay circuits 24a to 24e. The first delay circuit 24a comprises an inverter 21a receiving and inverting the clock signal $\phi$. The second to fifth delay circuits 24b to 24e respectively comprise NAND gates 23b to 23e and inverters 21b to 21e. The outputs of the delay circuits 24a to 24e provide the enable signals EN1 to EN5. The NAND gates of the respective delay circuits 24b to 24e receive the output of the inverter 22 and the outputs of the preceding delay circuits 24a to 24d. The inverters 21a to 21e have a limited driving capability, so transition in their outputs occurs with a certain delay after transition in their inputs. Desired delays can be obtained by adjusting the driving capabilities of the inverters 21a to 21e. Other types of delay circuits can of course be used in place of these inverters. The inverter 22 has a large driving capability since it must drive a number of NAND gates 23b to 23e simultaneously and the delay in the transition between its input and its output should be sufficiently small that the delay does not affect the logical operation of the control circuit.

As will be clear from the following description, the output of each of the delay circuits 24b to 24e goes high a certain delay time after both of its inputs become high, and goes low a certain delay time after either of its input goes low.

The operation of the control circuit 20 will be described next. Note that the output of a NAND gate is high when either of its inputs is low, and low when both of its inputs are high.

The clock signal $\phi$ is used as a multiplication timing signal which goes high in the interval from the end of one multiplication operation to the start of the next multiplication operation. When the clock signal $\phi$ goes high, the outputs of the inverters 21a and 22 go low. The low output of the inverter 22 is received by all the NAND gates 23b to 23e, so their outputs all go high; hence the outputs of the inverters 21b to 21e all go low. Thus the enable signals EN1 to EN5 supplied to all the unit circuits B in the array go low.

When the clock signal $\phi$ goes low, the output of the inverter 22 goes high. So does the output of the inverter 21a, so the enable signal EN1 goes high, but not immediately; the inverter 21a drives a capacitive load, which is distributed along the conductor transmitting the enable signal EN1 to the EN input terminals of the unit circuits B in the first stage S1 and is represented by an equivalent single capacitor C in FIG. 1, so it must charge this load before EN1 can go high. The limited driving capability of the inverter 21a ensures that there will be a delay from the high-to-low transition of the clock signal $\phi$ to the low-to-high transition of the enable signal EN1. This delay should approximately correspond to the time taken by the unit circuits in the first stage S1 to complete their operation, i.e., the interval from the reception of the multiplicand bits x1 to x4 and multiplier bit y1 until the first partial product is produced at the SO' and CO' outputs of the full adders 12 in the unit circuits in the first stage S1.

When the enable signal EN1 goes high, the inputs of the NAND gate 23b are both high, so its output goes low, causing the output of the inverter 21b to go high; thus the enable signal EN2 goes high. There is a delay from the high state of EN1 to the high state of EN2 similar to the delay between the high state of $\phi$ and the high state of EN1, due to the charging of the capacitive load distributed along the conductor transmitting the enable signal EN2. Again, this delay should approximately correspond to the time taken by the unit circuits in the second stage S2 to complete their operation, i.e., the interval from the reception of the first partial product from the unit circuits in the first stage S1 until a result is produced at the SO' and CO' outputs of the full adders 12 in the unit circuits in the second stage S2.

The same process continues through the succeeding delay circuits 24c to 24e, causing the enable signals EN3 to EN5 to go high in succession. After all the enable signals have gone high, they remain high until the clock signal $\phi$ goes high; then after a delay time corresponding to the discharge time of the capacitive loads, all the enable signals EN1 to EN5 go low simultaneously.

The process by which the parallel multiplier in FIG. 1 executes a multiplication operation will next be described with reference to FIG. 4. Let T be the propagation delay of the full adder 12 in each unit circuit B, that is, the delay in generating the sum output SO' and carry output CO', and let Ta be the delay between the clock signal $\phi$ and the first enable signal EN1 and between the successive enable signals EN1, EN2, EN3, EN4, and EN5. The driving capability of the inverters 21a to 21e in the control circuit 20 is assumed to be adjusted so that Ta is approximately equal to T. In order to maximize the effect of reducing the power consumption Ta should be larger than T. However, from the viewpoint of the speed of operation, Ta should not be larger than T. When Ta is smaller than T, the power saving is not so large as when Ta is larger than T. In the following explanation, Ta is assumed to be slightly larger than T.

Figure 4:
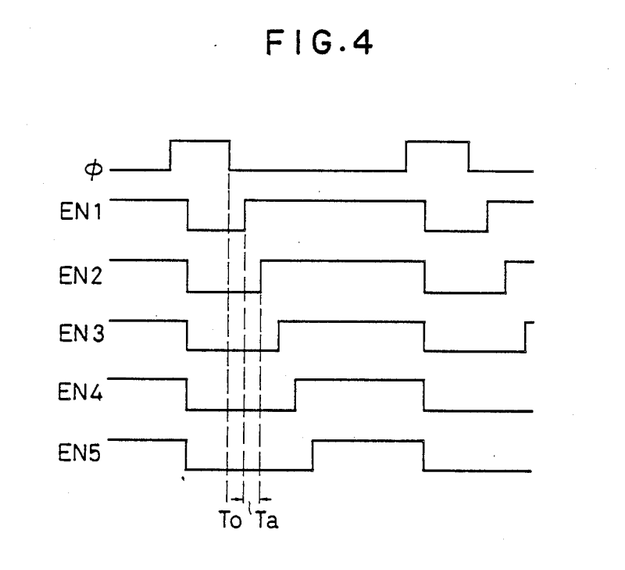
FIG. 4 is a timing chart illustrating the operation of the parallel multiplier in FIG. 1.

At time $T_0$ in FIG. 4, the multiplicand bits x1 to x4 and the multiplier bits y1 to y4 are furnished to the unit circuits B, which AND them to form partial products in the stages S1 to S4. The enable signals EN1 to EN5 are still low, disabling the outputs of the unit circuits B; that is, all outputs are held low. In the stage S1, the AND gates 11 create the partial product bits x1*y1 to x4*y1. At time $T_0+T$, the full adders 12 in the stage S1 generate sum outputs SO' (which are simply the partial product bits x1*y1 to x4*y1) and carry outputs CO' (which are "0"). Then at time $T_0+Ta$ the enable signal EN1 goes high, enabling the AND gates 13 and 14 in the stage S1 to pass these sum and carry outputs SO' and CO' as SO and CO to unit circuits B in the stage S2.

Thus at time $T_0+Ta$ the unit circuits B in the stage S2 begin receiving, in addition to the multiplicand bits x1 to x4 and the multiplier bit y2, the sum and carry outputs SO and CO from the stage S1. After an interval of T, the full adders 12 in the stage S2 have added these inputs, thus adding the partial product in the stage S1 to the partial product in the stage S2. At time $T_0+2Ta$ the enable signal EN2 goes high and the sum and carry outputs SO and CO representing the sum of the first two partial products are provided to the stage S3. The full adders in the stage S3 then add this sum to the third partial product. At time $T_0+3Ta$ the result is passed to the full adders in the stage S4, which add it to the fourth partial product.

At time $T_0+4Ta$, when the enable signal EN4 goes high, the unit circuits B in the final stage S5 receive from the unit circuits B in the stage S4 the sum bits SO and carry bits CO representing the total sum of all the partial products. At the time $T_0+5Ta$, the enable signal EN5 goes high, enabling the AND gates 13 and 14 in the unit circuits B in the final stage S5 of the array. At this point the sum outputs SO of the unit circuits B the column C1 of the stages S1 to S4 are the bits P1 to P4 of the final product, and the sum output SO of the unit circuit B in the column C1 of the final stage S5 is the bit P5 of the final product. The carry output CO of this unit circuit B is furnished to the multiplier (y) input of the unit circuit B in the column C2 of the final stage S5, the multiplicand (x) input of which is fixed at "1," so after a delay of T, this unit circuit B adds this carry bit to the bits received from the stage S4, thus producing the correct P6 bit of the final product. Similarly, after another delay of T the unit circuit B in the column C3 of the final stage S5 produces the correct P7 bit of the final product, and after a further delay of T the unit circuit B in the column C4 of the final stage S5 produces the correct P8 bit. Thus at the time $T_0+5Ta+3T$ all bits P1 to P8 of the product are correct and the multiplication operation is completed. The product is held at the output terminals P1 to P8 until the clock signal $\phi$ goes high; then all bits P1 to P8 go low.

In this way the outputs of the unit circuits in each stage are held at the disabled state until about the time when the operation at the unit circuits in the particular stage is completed and the results of the operation are ready to appear at the outputs. Thus, the outputs of the unit circuits in the respective stages are enabled approximately in time with the "progress" of the systolic operation.

Because the sum output SO and the carry output CO of the unit circuits B in each stage are disabled until the completion of the operation, in a 4×4-bit multiplier power consumption is reduced by about 30% as compared with the prior art. The power saving increases with the scale of the circuit; in an 8×8-bit parallel multiplier, for example, the power saving is about 40%, and in a 16×16-bit multiplier it is about 65%.

Next another type of unit circuit A will be described with reference to FIG. 5. This unit circuit A will be employed in further embodiments of the invention.

Figure 5:
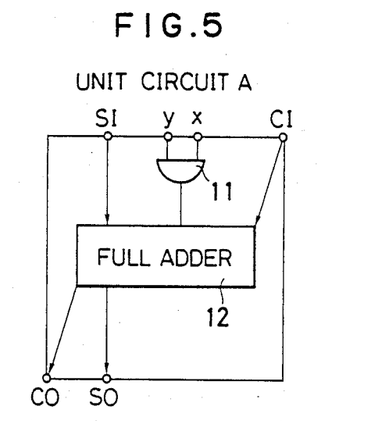
FIG. 5 is a schematic diagram illustrating another type of unit circuit.

The unit circuit A illustrated in FIG. 5 comprises an AND gate 11 for receiving a multiplicand bit x and a multiplier bit y and generating the partial product bit x*y, and a full adder 12 for adding the partial product bit x*y to a sum input SI and a carry input CI. That is, the unit circuit A in FIG. 5 is identical to the unit circuit B in FIG. 2 without the enabling means formed by EN input terminal the AND gates 13 and 14.

Figure 6:
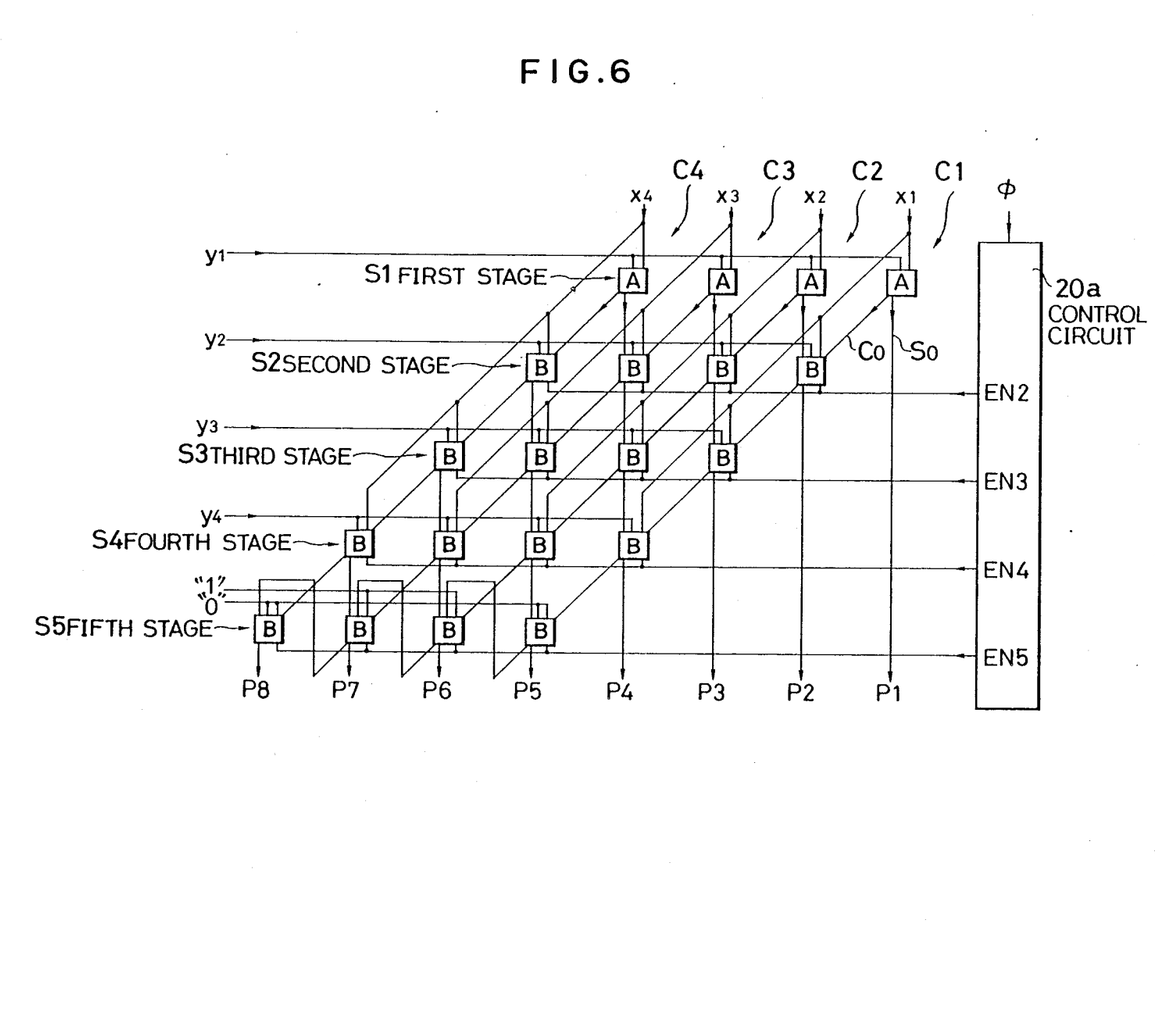
FIG. 6 is a schematic diagram illustrating another parallel multiplier embodying the present invention.

FIG. 6 illustrates another 4×4-bit parallel multiplier embodying the present invention. The array configuration of this parallel multiplier is identical to that in FIG. 1 except that the unit circuits B in the first stage S1 are replaced by unit circuits A of the type shown in FIG. 5. The control circuit 20a is identical to the control circuit 20 in FIG. 1 except that it does not generate an enable signal EN1. The sum inputs SI and carry inputs CI of the unit circuits A in the stage S1 are fixed at "0." Thus, in this embodiment, the enable signals are supplied to the unit circuits in the stages (S2 to S5) other than the first stage S1, or in other words, only to the unit circuits in the stages on the downstream side of the array.

Since the sum and carry inputs SI and CI of the unit circuits A in the stage S1 are fixed at "0," it is possible to eliminate these inputs, and also to eliminate the full adders 12 from the unit circuits A in the stage S1. The unit circuits A in the stage S1 then consist only of the AND gates 11 for generating the partial product bits x1*y1 to x4*y1.

Figure 7:
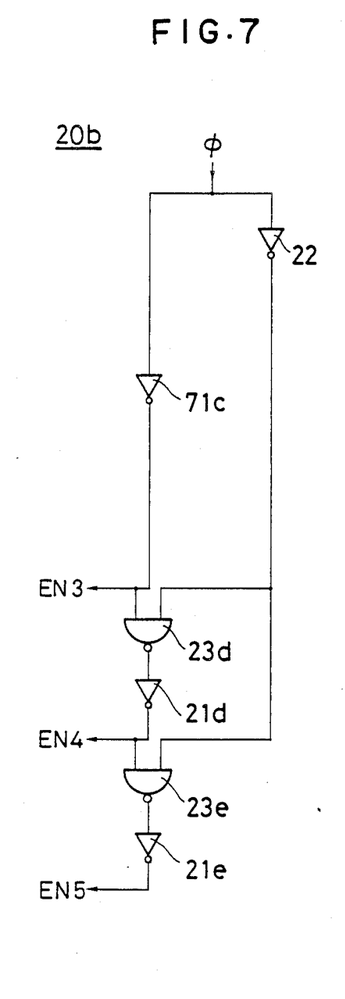
FIG. 7 is a schematic diagram illustrating another control circuit which can be used in the embodiment of FIG. 6.

The unit circuits B in the stage S2 in FIG. 6 can also be replaced with the unit circuits A of FIG. 5, thus permitting the enable signal EN2 also to be eliminated and a simplified control circuit 20b, shown in FIG. 7 to be used. Here, the inverter 71c should have a lower driving power and hence provide a longer delay time of about 3Ta. Although this arrangement increases the power consumption of the circuit, power consumption is still significantly lower than in the prior art.

Figure 8:
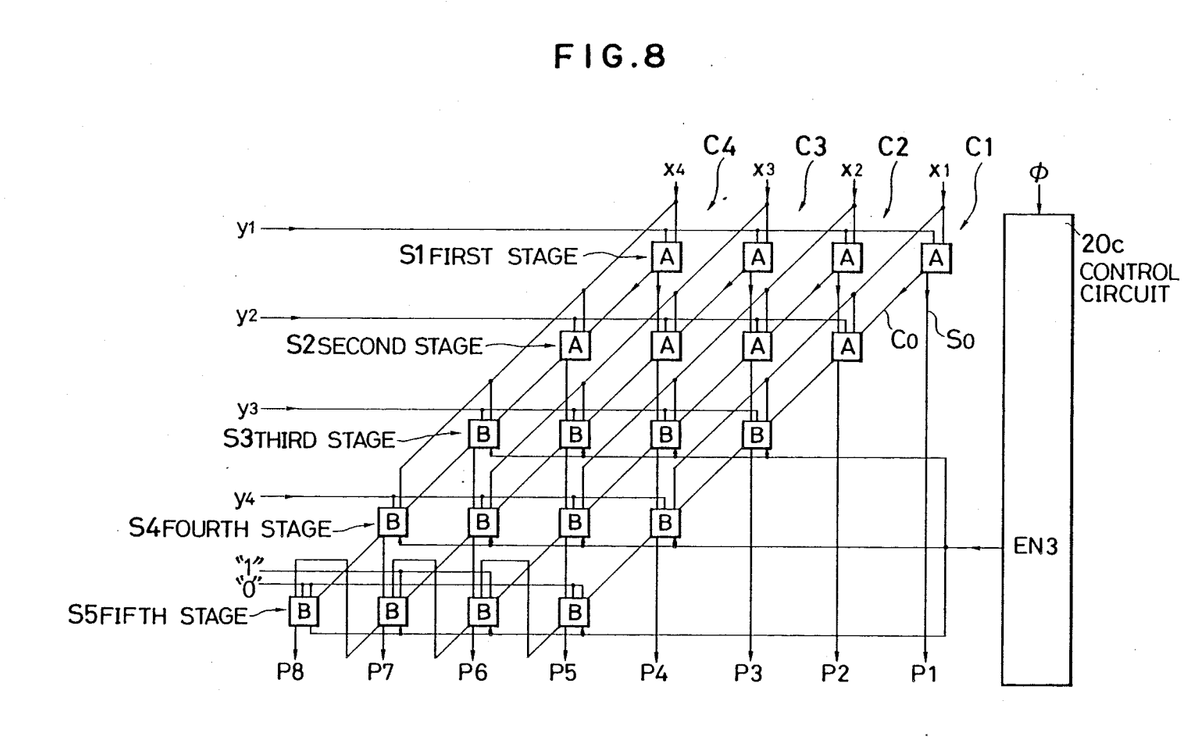
FIG. 8 is a schematic diagram illustrating yet another parallel multiplier embodying the present invention.

FIG. 8 illustrates yet another 4×4-bit parallel multiplier embodying the present invention. In this parallel multiplier, the unit circuits B in the stage S1 and the stage S2 are replaced with unit circuits A shown in FIG. 5, and the control circuit 20c generates only a single enable signal EN3 which it provides to the unit circuits B in the stages S3 and S4 and the final stage S5. Thus, in this embodiment, the same enable signal EN3 is supplied to the unit circuits in the three stages on the downstream side. The control circuit 20c can be similar to the control circuit 20b shown in FIG. 7, except that the delay circuits 24d and 24e can also be omitted.

The operation of the parallel multiplier in FIG. 8 will be briefly explained with reference to the timing chart in FIG. 9.

Figure 9:
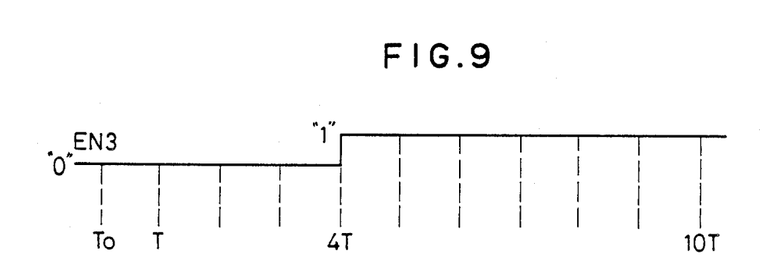
FIG. 9 is a timing chart illustrating the operation of the parallel multiplier in FIG. 8.

The time $T_0$ in FIG. 9 is the time at which the AND gates 11 in the unit circuits A and B generate the partial product bits x*y. The time T is the propagation delay of the full adders 12 that generate the sum and carry outputs in the unit circuits A and B. At time $T_0+4T$ the control circuit 20c makes the enable signal EN3 go high, thus providing a "1" input to the EN3 terminals of the unit circuits B in the stages S3 and S4 and the final stage S5. The correct product is obtained at time $T_0+10T$. Disabling the outputs of the unit circuits B in the last three stages for the interval of 4T reduces power consumption by about 20% as compared with the prior art, and the control circuit 20c can be greatly simplified because it need only generate a single enable signal EN3.

Figure 10:
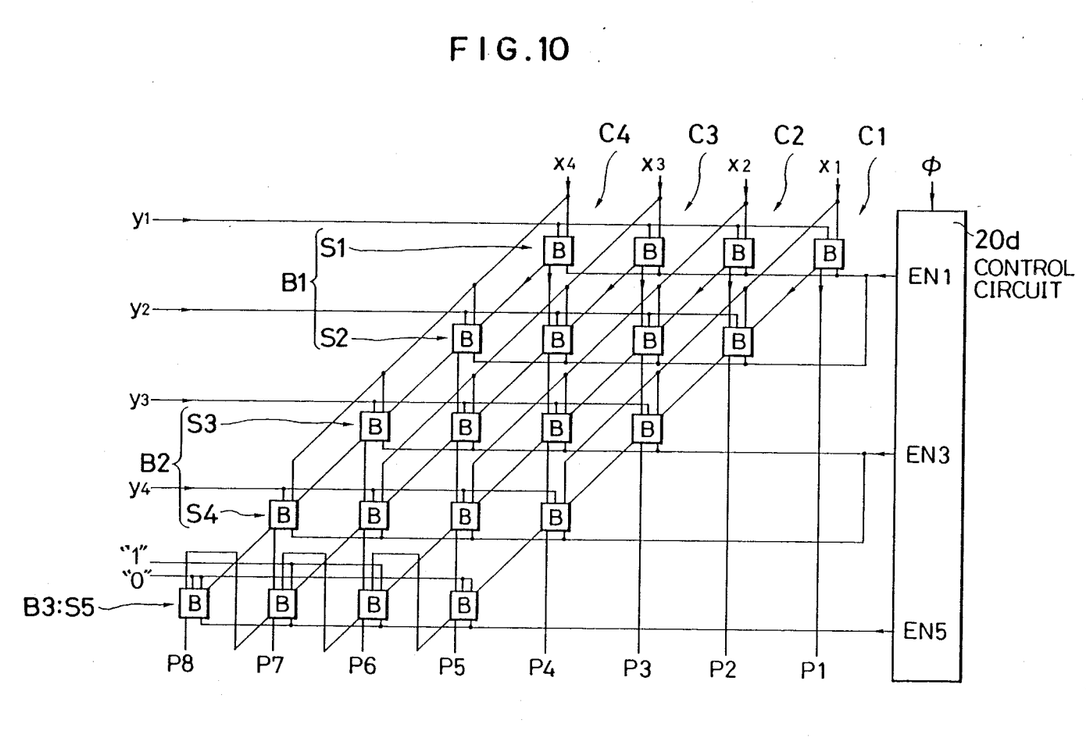
FIG. 10 is a schematic diagram illustrating another parallel multiplier embodying the present invention.
Figure 11:
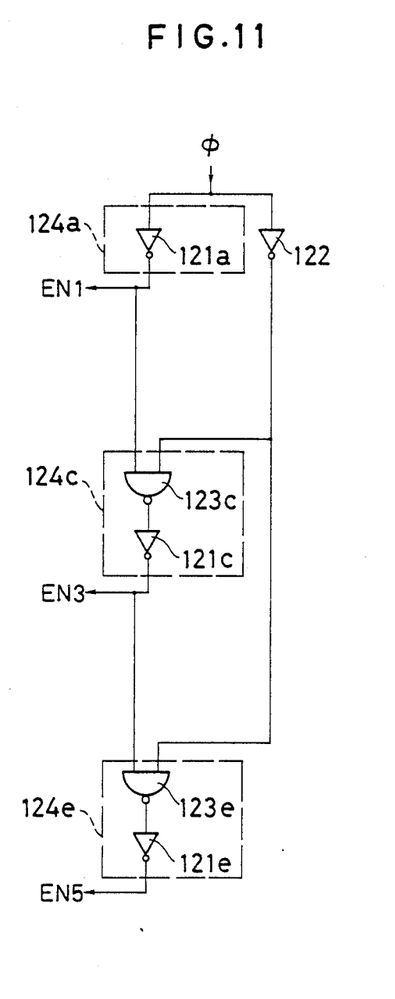
FIG. 11 is a schematic diagram illustrating another type of the control circuit which can be used in the embodiment of the FIG. 10.

FIG. 10 shows another embodiment of the invention. In this embodiment, the array is divided into three blocks B1, B2 and B3. The block B1 consists of the first and second stages S1 and S2, which are adjacent to each other. The block B2 consists of the third and fourth stages S3 and S4 that are adjacent to each other. The block B3 consists of the final stage S5 alone. A first enable signal EN1 is supplied to all the unit circuits in the block B1. A second enable signal EN3 is supplied to all the unit circuits in the block B2. A third enable signal EN5 is supplied to all the unit circuits in the block B3. A control circuit 20d, shown in FIG. 11, can be used in connection with the array shown in FIG. 10. The control circuit comprises an inverter 122 and three delay circuits 124a, 124c and 124e. The inverter receives and inverts the clock signal $\phi$. The first delay circuit 124a comprises an inverter 121a receiving and inverting the clock signal $\phi$. The delay time of the first delay circuit 124a is Ta. The second delay circuit 124c comprises a NAND gate 123c receiving the output of the first delay circuit 124a and the output of the inverter 122, and an inverter 121c receiving the output of the NAND gate 123c. The delay time of the second delay circuit 124c is 2Ta. The third delay circuit 124e comprises a NAND gate 123e receiving the output of the second delay circuit 124e and the output of the inverter 122, and an inverter 121e receiving the output of the NAND gate 123e. The delay time of the second delay circuit 124e is 2Ta. The enable signal EN1 is produced when the operation in the unit circuits in the first stage S1 is completed. The enable signal EN3 is produced when the operation in the unit circuits in the third stage S3 is completed. The enable signal EN5 is produced when the operation in the unit circuits in the final stage S5 is completed. In this embodiment, the power saving is smaller than in the embodiment of FIG. 1, but the construction of the control circuit can be simpler.

The scope of this invention is not limited to the preceding embodiments but includes many modifications which will be obvious to one skilled in the art. Such modifications include, but are not confined to, the following:

In FIG. 2, positive logic was employed and AND gates 13 and 14 were used as the enabling means to force the sum and carry outputs SO and CO to "0" until enabled by an enable signal, but other circuits capable of performing the same function can also be used as these enabling means. Alternatively, negative logic can be employed and NAND gates can be used to force these signals to "1" when not enabled. It is also possible to provide enabling means for the inputs SI and CI of the full adders 12 instead of their outputs SO and CO, thus forcing the inputs SI and CI to "0" or "1" while the enable signals EN1 to EN5 or EN are in the inactive state.

The control circuit 20 in FIG. 3 can have a different configuration. Similar modifications can be made in the control circuits 20a, 20b, 20c and 20d. It is also possible to generate enable signals with different delays by varying the load capacities of the EN input terminals in different stages in the array.

The unit circuits A and B can be employed in different stages according to schemes other than those shown in the drawings. The unit circuits in the stage S1, the final stage and the column C4 can be modified to eliminate unnecessary inputs.

What is claimed is:

1. A low-power parallel multiplier for performing a multiplication operation on a multiplicand input and a multiplier input, comprising:

an array comprising stages and columns of unit circuits, each unit circuit receiving a one-bit multiplicand input, a one-bit multiplier input, a one-but sum input, and a one-bit carry input, performing bit multiplication on said multiplicand input and said multiplier input to generate a bit product, and performing bit addition on said bit product, said sum input, and said carry input to generate a one-bit sum output and a one-bit carry output, said sum output and said carry output assuming a first state and a second state to represent a binary bit, power consumption being lower in said first state than in said second state;

interconnections between the sum output of each unit circuit not disposed in the first column or last stage of said array and the sum input of the unit cell in the next stage and preceding column, and interconnections between the carry output of each unit circuit not disposed in the last stage of said array and the carry input of the unit circuit in the same column in the next stage, with binary zero inputs being provided to the sum inputs and carry inputs of the unit cells in the first stage of said array; and a control circuit coupled to the unit circuits of at least one stage of said array, for keeping the sum outputs and the carry outputs of said unit circuits in said first state until a certain time.

2. A multiplier according to claim 1, wherein said control circuit keeps the sum outputs and the carry outputs of the unit circuits of at least one stage of said array in said first state until completion of said bit additions by the unit circuits in the same stage.

3. A multiplier according to claim 1, wherein said control circuit is coupled to provide enable signals, having active and inactive states, to one or more respective stages of said array and causes said enable signals to enter the active state sequentially.

4. A multiplier according to claim 3 wherein said sum outputs and said carry outputs are kept in said first state while said enable signal is in said inactive state.

5. A multiplier according to claim 4, wherein each of the unit circuits whose output is kept at said first state by said control circuit comprises:

an AND gate for receiving said multiplicand input and said multiplier input and performing a logical AND operation thereon to generate said bit product;

a full adder for receiving said sum input, said carry input, and the bit product generated by said AND gate, and performing an addition operation thereon to generate said sum output and said carry output; and an enabling means for enabling or disabling transfer of said sum output and said carry output of said adder to said sum output and said carry output of said unit circuit.

6. A multiplier according to claim 5, wherein said enabling means comprises a first AND gate for ANDing said sum output with said enable signal and a second AND gate for ANDing said carry output with said enable signal.

7. A multiplier according to claim 4, wherein said control circuit generates a separate enable signal for each stage of said array and causes said enable signals to enter the active state at short intervals in consecutive sequence.

8. A multiplier according to claim 7, wherein said control circuit comprises a plurality of delay circuits connected in series and generating as outputs said enable signals for the respective stages, a single timing signal being supplied as an input to all the delay circuits, and the output of each delay circuits except the last one in the series being supplied as an input to the next delay circuit in the series.

9. A multiplier according to claim 8, wherein a first one of said delay circuits comprises an inverter receiving the multiplication timing signal, and each of said delay circuits except said first one comprises a NAND gate receiving said multiplication timing signal and the output of the preceding delay circuit and performing a logical NAND operation thereon to generate an output, and an inverter receiving and inverting the output of the NAND gate.

10. A multiplier according to claim 9, wherein the inverter in each of said delay circuits has a driving capability low enough to provide a predetermined delay time between a change in an input to the delay circuit and a change in the output of the delay circuit.

11. A multiplier according to claim 10, wherein said enable signals are transmitted to said unit circuits by conductors having distributed capacitive loads, the time required for respective inverters in the delay circuits to charge said distributed capacitive loads constituting said predetermined delay time.

12. A multiplier according to claim 11, wherein the delay time of each of the delay circuits substantially equals the time taken by the unit circuits in each stage to complete said bit multiplication and bit addition.

13. A multiplier according to claim 1, where said array comprises blocks of stages, each block consisting of either one stage, or two or more stages adjacent to each other, and said control circuit keeps the outputs of the unit circuits in all the stages in each block in said first state until a certain time.

14. A multiplier according to claim 13, wherein each block consists of one stage, and said control circuit keeps the outputs of said unit circuits in some or all of said stages of said array in said first state until completion of said bit multiplications and said bit additions in the unit circuits in the particular stage.

15. A multiplier according to claim 13, wherein said control circuit is coupled to provide respective enable signals, having active and inactive states, to the respective blocks.

16. A multiplier according to claim 15, wherein the sum outputs and carry outputs of the unit circuits in a block are kept in said first state while the respective enable signal is in said inactive state.

17. A multiplier according to claim 16, wherein each of the unit circuits whose output is kept at said first state by said control circuit comprises:

an AND gate for receiving said multiplicand input and said multiplier input and performing a logical AND operation thereon to generate said bit product;

a full adder for receiving said sum input, said carry input, and the bit product generated by said AND gate, and performing an addition operation thereon to generate said sum output and said carry output; and an enabling circuit for enabling or disabling output of said sum output and said carry output from said unit circuit in response to an enable signal received from said control circuit.

18. A multiplier according to claim 17, wherein said enabling circuit comprises a first AND gate for ANDing said sum output with said enable signal and a second AND gate for ANDing said carry output with said enable signal.

19. A multiplier according to claim 18, wherein said control circuit causes said enable signals go to the active state at intervals in consecutive sequence.

20. A multiplier according to claim 19, wherein said control circuit comprises a plurality of delay circuits connected in series and generating as outputs said enable signals for the respective blocks, a single a multiplication timing signal being supplied as an input to each delay circuit, the output of each delay circuit except the last in the series being supplied as an input to the next delay circuit in the series.

21. A multiplier according to claim 20, wherein a first one of said delay circuits comprises an inverter receiving the multiplication timing signal, and each of said delay circuits except said first one comprises a NAND gate receiving said multiplication timing signal and the output of the preceding delay circuit and performing a logical NAND operation thereon to generate an output, and an inverter receiving and inverting the output of the NAND gate.

22. A multiplier according to claim 21, wherein the inverter in each of said delay circuits has a driving capability low enough to provide a predetermined delay time between a change in an input to the delay circuit and a change in the output of the delay circuit.

23. A multiplier according to claim 21, wherein said enable signals are coupled to said unit circuits by conductors having distributed capacitive loads, the time required for respective inverters in the delay circuits to charge said distributed capacitive loads constituting said predetermined delay time.

24. A multiplier according to claim 23, wherein the delay time of each delay circuit except the first delay circuit substantially equals the time taken by the unit circuits in the block preceding the block to which the delay circuit sends an enable signal to complete said bit multiplications and bit additions.

* * * * *